Figure 3:
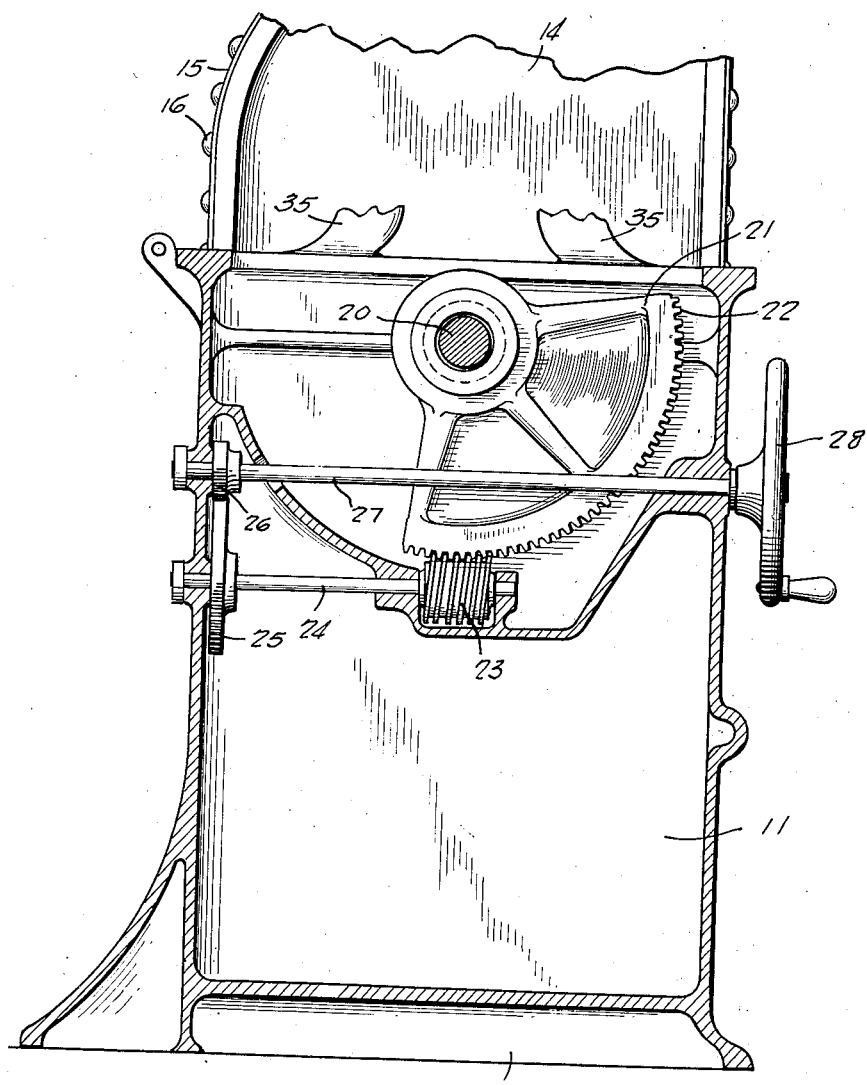

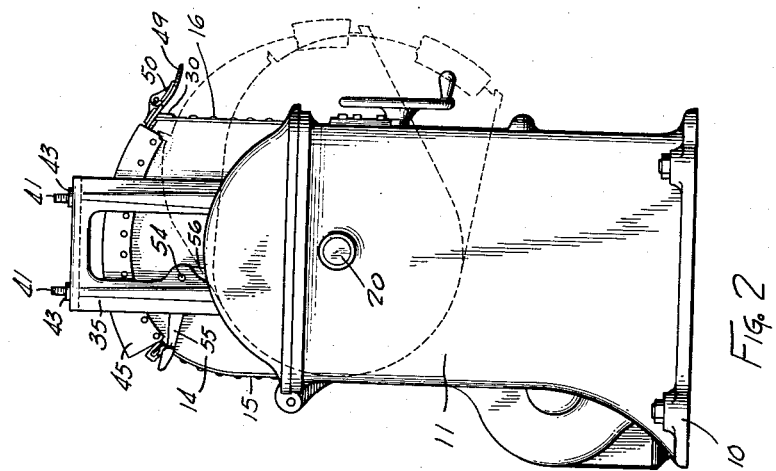

April 25, 1939.   R. M. TEMPLE   2,155,454
DOUGH MIXING APPARATUS
Filed July 9, 1936   4 Sheets-Sheet 2

INVENTOR.
ROBERT M. TEMPLE
BY Joshua R. H. Potts
ATTORNEY.

INVENTOR.
ROBERT M. TEMPLE
BY Joshua R H Hopps
ATTORNEY.

April 25, 1939.  R. M. TEMPLE  2,155,454

DOUGH MIXING APPARATUS

Filed July 9, 1936  4 Sheets-Sheet 4

INVENTOR.
ROBERT M. TEMPLE
BY
ATTORNEY.

Patented Apr. 25, 1939

2,155,454

UNITED STATES PATENT OFFICE 2,155,454

DOUGH MIXING APPARATUS

Robert M. Temple, Philadelphia, Pa.

Application July 9, 1936, Serial No. 89,731

9 Claims. (Cl. 220—41)

This invention relates to apparatus commonly employed for the purpose of mixing dough and is concerned primarily with machines intended for use in bakeries and other institutions where large batches of dough are to be mixed at a single mixing.

At the present time there is available to the public a mixing machine of the type with which this invention is concerned, which is meeting with widespread approval. Such a machine is characterized as comprising a casing which defines a mixing chamber and which casing is pivotally mounted for the purpose of discharging the batch of materials mixed in the mixing chamber. The casing has an open top and a cover of the canopy type is associated with the open top of the casing for closing the same during mixing operations. Located for operation within the mixing chamber are a plurality of mixing elements which preferably are of the type shown in the Temple Patent No. 1,120,563, dated December 8, 1914.

Due to the fact that the mixing elements are operated at a comparatively high rate of speed, the contents of the mixing chamber are violently agitated and there is, therefore, a very noticeable tendency on the part of the materials being mixed to escape over the upper edge of the mixing chamber at the point of joinder with the canopy cover.

With the foregoing conditions in mind, this invention has in view, as an important objective, the provision of a dough mixer of the character described which includes a tilting mixing chamber and a canopy cover, together with means for providing a good interlock between the edges of the open top of the mixing chamber and the cover whereby a good seal against the escape of the materials in the mixing chamber is provided.

Associated with this phase of the invention is another important object which is the provision of an interlock between one edge of the open top of the mixing chamber and the canopy cover, and which interlock is broken incident to tilting movement of the mixing chamber so as to readily permit such tilting movement for loading and discharging purposes.

Inasmuch as the materials in the mixing chamber are violently agitated during mixing, these materials strike against the under surface of the cover and exhibit a tendency to adhere thereto. Accordingly, this invention has in view, as another important object, the provision of scraping means which is associated with the mixing chamber and which is effective to scrape the under side of the cover.

In carrying out this idea in a practical embodiment, a scraping blade or knife is mounted along one edge of the open top of the mixing chamber and during mixing operations, this knife edge interlocks with a channel construction formed on the canopy cover. When the mixing chamber is tilted, the blade comes out of the channel with a slight upward movement being imparted to the cover and the under side of the cover is scraped with the scrapings falling back into the mixing chamber.

Yet another important objective of the present invention is the provision of hanger means for properly supporting the canopy cover in position over the mixing chamber. In accordance with this invention, a certain amount of movement on the part of the cover is permitted so as to insure proper action of the scraping blade and, to this end, the cover is provided with hangers which cooperate with supporting structure carried by the framework of the mixing machine. Under the influence of these hangers, the cover is supported in position with a very slight amount of movement permitted at the front edge of the mixing chamber and a greater amount permitted at the rear edge where the scraping knife is located.

Inasmuch as withdrawal of the scraping knife from the channel member in which it is interlocked is accompanied by an upward movement on the part of the cover, this invention has in view, as a further objective, the provision of cam means for raising one edge of the cover and maintaining this edge in an upraised position incident to tilting movement on the part of the mixing chamber. While the angular disposition of the scraping blade with respect to the pivotal mounting of the mixing chamber ordinarily will initiate this upward movement on the part of the cover, the cam means is intended to assist in such raising movement and also be effective to maintain the rear edge of the cover in this upraised position as it is being scraped and until the scraping blade has again returned to the position in which it is to be received in the channel structure carried by the cover.

Various other more detailed objects and advantages, such as those associated with the carrying out of the above noted thoughts in a practical embodiment, will in part become apparent and in part be hereinafter stated as the description of the invention proceeds.

The invention, therefore, comprises dough mixing apparatus which includes a tilting mixing chamber having an open top, with which is associated a canopy cover. This canopy cover is supported by a hanger arrangement permitting of a slight amount of vertical movement. A scraping blade is carried by one edge of the open top of the mixing chamber and this scraping blade is normally received in a channel structure carried by the cover to provide an interlock which effectively guards against the escape of materials over this edge of the open top. Suitable structure providing a similarly effective seal is provided around the other edges. A cam device is provided which assists in raising the edge of the cover which carries the channel structure and maintain said edge in properly upraised position during tilting movement of the mixing chamber.

Figure 4:
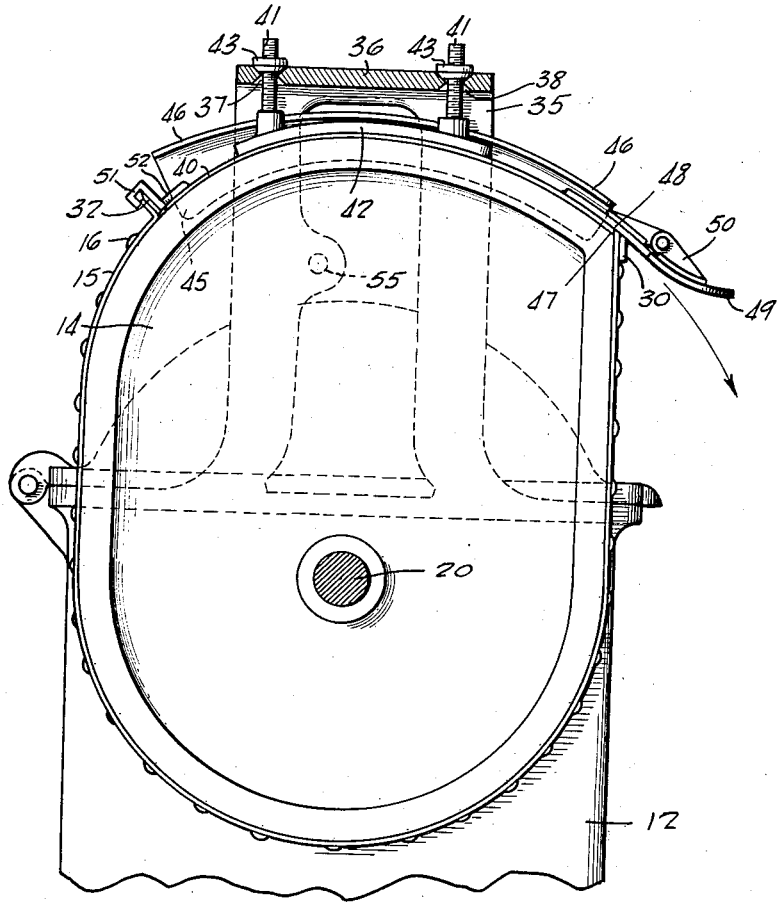
Figure 5:
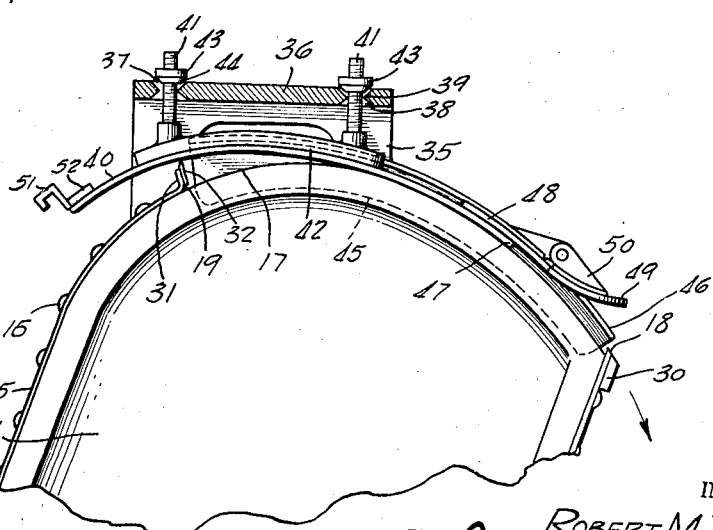
Figure 6:
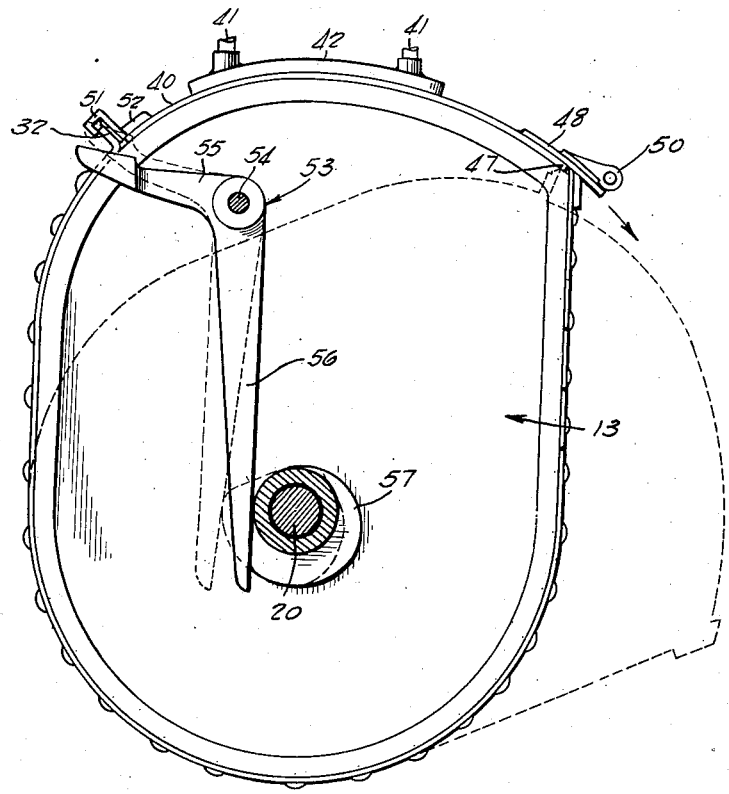
Figure 7:
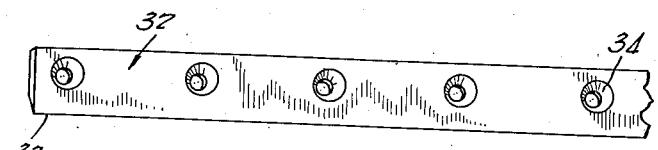

For a full and more complete understanding of the invention, reference may be had to the following description and accompanying drawings wherein:

Figure 1 is a view in front elevation of a dough mixing machine made in accordance with the precepts of this invention, Figure 2 is a side elevational showing taken looking in the direction indicated by the arrow 2 of Figure 1, Figure 3 is a transverse section through part of the chamber supporting apparatus developing the mechanism which is employed for chamber tilting purposes, Figure 4 is a side view, partly in section, bringing out in detail the hanger construction of the cover and the manner in which the straight edges of the mixing chamber interlock with the cover, Figure 5 is a fragmentary showing somewhat similar to Figure 4, bringing out the mixing chamber in position as it is being tilted, Figure 6 is a side view, with parts removed, bringing out the cam means which is employed in raising the cover, and Figure 7 is a detailed view in perspective of the scraping knife.

Referring now to the drawings, wherein like reference characters denote corresponding parts, a dough mixing machine, such as contemplated by this invention, is shown in Figure 1 as comprising supporting structure including a base 10 and end uprights referred to generally as 11 and 12.

Tiltably supported between the upright structures 11 and 12, is a casing 13 which defines a mixing chamber. This casing 13 is shown as consisting of flat end walls 14 and a curved wall 15 which is fastened to flanges on the end walls in any preferred manner, as by rivets 16. The casing 13 is formed with an open top which is defined by the upper arcuate edges of the end walls 14, which are designated 17, and the straight front and rear edges 18 and 19 of the curved wall 15.

The mixing chamber 13 is mounted for tilting movement on an axis designated 20 and this pivotal member 20 is supported at each end in the structures 11 and 12. While the particular manner in which the mixing chamber 13 is tilted does not play a particular part in the present invention, as this tilting action may be accomplished under power or manually, as occasion demands, the illustrated embodiment of the invention shows the mixing chamber 13 as tiltable under manual power. In this connection, reference is now made to Figure 3 in which a quadrant 21 is shown as being non-rotatably mounted with respect to the axis of the mixing chamber. This quadrant 21 is drivably connected with the mixing chamber 13. This quadrant 21 is formed with a gear teeth 22 which mesh with a worm 23 which is mounted on a shaft 24. This shaft 24 is properly supported in the casing construction and at one end carries a gear 25 which meshes with a pinion 26 that is non-rotatably mounted on a shaft 27. The latter extends across the end structure 11 and at one end carries an operating member in the form of a hand wheel 28. It is evident that the hand wheel 28 may be turned to tilt the mixing chamber into either discharging or mixing position as occasion demands.

Located within the mixing chamber 13 are mixing elements which may take any preferred form, but the invention particularly contemplates a machine in which mixing elements of the type clearly illustrated and described in Temple Patent No. 1,120,563 are employed. However, the particular type of mixing elements and the manner in which they are driven do not enter into the present invention other than being essential elements to a complete machine.

The front edge of the mixing chamber 13, which has been identified as 18, is shown as being provided with a reinforcing strip 30 which may be anchored thereto in any preferred manner, as by welding. This strip is clearly shown in Figures 4 and 5. The rear edge of the open top of the mixing chamber, which has been identified as 19, is shown as consisting of a turned-out flange 31 to which is affixed a scraping element in the form of a knife blade 32, this blade 32 having a scraping edge identified at 33. While the blade 32 may be affixed to the flange 31 in any preferred manner, this invention has in view an arrangement in which the blade 32 is replaceable. Hence, a detachable connection is provided by openings 34 with which cooperate appropriate fastening elements having heads which are countersunk as indicated in Figure 7.

Upstanding from the end structures 11 and 12 at each end of the machine, is an upright supporting member designated 35. Each of the supporting members 35 is formed with a flange 36 which hangs over the open top of the mixing chamber 13.

Referring now more particularly to Figure 5, each of the flanges 36 is shown as formed with a pair of spaced openings 37 and 38, respectively, and which openings are defined by two truncated conical surfaces which meet to define an edge indicated at 39.

A cover of the canopy type is shown at 40 and is of the proper curvature which permits tilting action on the part of the mixing chamber in a manner to be hereinafter described in detail. This cover 40 is supported in position by hangers which take the form of threaded elements 41 which are anchored at one end to plates 42 which are in turn secured to the upper surface of the cover 40, as by welding, and these threaded members 41 extend upwardly through the openings 37 and 38. They carry nuts 43 which are formed with conical surfaces 44 which are designed as substantially complemental to the upper conical surfaces of the openings 37 and 38.

It is evident that the above described structure is effective to hang the canopy cover 40 in effective position over the open top of the mixing chamber 13 and, at the same time, permit of a certain amount of vertical and rocking movement on the part thereof.

At this point it is well to note that the upper arcuate edges 17 of the end walls 14 carry arcuate angle members 45 having flanges 46 which overlie the corresponding edges of the cover 40. In normal mixing position, such as shown in Figure 4, the flanges 46 are spaced a slight distance above the canopy cover 40 so as to permit of the upward movement thereof. At the same time, these angle members 45 provide an effective seal against the escape of materials from the mixing chamber.

Referring now more particularly to Figure 4, the front edge of the cover 40 is terminated at 47. Overhanging the edge 47 is a plate 48 which may be affixed to the upper surface of the cover 40 in any preferred manner, as by welding. It is notable that the plate 48 and front edge 47 of the cover 40 define an angularly shaped notch which receives the front edge 18 and reinforcement 30 of the mixing chamber 13 when the latter is in mixing position as shown in Figure 4. This arrangement of parts insures a good seal against the escape of materials in the mixing chamber over this edge during mixing.

A guard flap in the form of a plate 49 is shown as hingedly mounted on the plate 48 by the hinges designated 50. The purpose of the guard flap 49 is to warn a person having his hand on the free edge 18 of the mixing chamber, when the latter is in a tilted position and is being returned into mixing position, to remove his hand so as to prevent bodily injury.

At the rear edge, the cover 40 carries a channel member 51 formed with a flange 52 which is anchored to the upper surface of the cover, as by welding, and this channel member receives the flange 31 and blade 32 to provide an effective seal along this rear edge. At the same time, the interlock between these parts prevents upward movement of the cover incident to striking of the materials in the mixing chamber thereagainst during mixing.

At this point it is well to note that the plane along which the blade 32 engages the channel member 51 is not in line with any radius of the axis 20, because, as upon tilting movement being imparted to the mixing chamber 13 under the influence of manual power exerted on the wheel 28, the blade 32 engages the channel member 51 with a cam action to raise the rear edge of the cover 40, such upward movement taking the form of a rocking action which is permitted by the conical formation of the openings 37 and 38. For the purpose of assisting in such upward movement on the part of the cover 40, and also to the end of maintaining the rear edge of the cover in this upraised position, a cam device is located at each end of the casing 13 and is shown as comprising a bell crank, referred to generally as 53, which is pivotally mounted at 54 to the respective supporting structure 35. The bell crank 53 has a short arm 55 which extends beyond the periphery of the mixing chamber 13 when the latter is in mixing position and engages that portion of the channel member 51 which extends beyond the mixing chamber 13. The bell crank 53 has a long arm 56 which extends downwardly to a point adjacent the axis 20 where it engages a cam member 57 that is non-rotatably mounted with the mixing chamber 13.

It is evident that the gravity action caused by the weight of the arms 55 will normally maintain the long arm 56 in engagement with the cam 57. As the mixing chamber is tilted, the cam 57 will affect the long arm 56 of the bell crank 53 to move the latter into the dotted line position shown in Figure 6 whereby the rear edge of the cover 40 is upraised and maintained in this upraised position during further tilting of the mixing chamber 13.

The operation of the mechanism above set forth may be briefly described by noting that as a batch of materials is being mixed, the mixing chamber will be in the position shown in full lines in Figures 2, 4, and 6. In this position, the front edge 18 and reinforcement 30 is received in the notch defined by the front edge 47 of the cover 40 and the plate 48 to provide an effective seal along the front edge of the open top of the mixing chamber. Likewise, the flange 31 and blade 32 are received in the channel member 51 to provide an effective seal along the rear edge of the open top of the mixing chamber. Escape of materials in the mixing chamber at each end is guarded against by the angle bars 45.

When a batch of materials has been mixed a desired length of time and it becomes necessary to discharge same from the mixing chamber, the latter is tilted into discharging position by turning the hand wheel 28. Through the driving connections illustrated in Figure 3, the quadrant 21 is turned to tilt the mixing chamber. The cam influence of the blade 32 on the channel member 51 causes an upraising of the rear edge of the cover 40 which movement is assisted by the cams 57 and bell cranks 53. As the mixing chamber 13 is tilting into discharging position, the knife edge 33 engages the under surface of the cover 40 to scrape any material which may adhere to the under surface of the cover 40 therefrom, and these materials will fall back into the mixing chamber. As the tilting movement progresses, the rear edge of the cover 40 is upraised an appreciable distance whereas the front edge is moved upwardly only very slightly. Thus a rocking movement is imparted to the cover and this rocking movement is provided for by a hanger construction consisting of the hangers 41 and the flanges 36 having the conical shaped openings 37 and 38.

When the mixing chamber 13 has been suitably tilted and is to be returned to mixing position, the guard flap 49 will warn a person against having his hand caught between the front edge 18 of the mixing chamber and the corresponding edge of the canopy cover 40. As the mixer is tilting backwardly into mixing position, the long arm 56 of the bell crank 53 rides off the cam surface 57 to permit the rear edge of the cover 40 to be lowered, whereupon the flange 31 and blade 32 are again received in the channel 51.

While a preferred specific embodiment of the invention is herein illustrated and described, it is to be clearly understood that I am not to be limited to the exact constructions illustrated and described because various modifications of these details may be provided in putting the invention into practice within the purview of the appended claims.

I claim:

1. Mixing apparatus of the character described comprising supporting structure, a mixing chamber tiltably carried by said supporting structure and having an open top, a canopy cover also carried by the supporting structure and positioned above said open top, said cover being movably supported by the supporting structure and movably incident to tilting movement of the mixing chamber, and cam means including a part engaging one edge of the said cover for upraising said edge incident to tilting movement of the mixing chamber.

2. Dough mixing apparatus of the character described comprising a mixing chamber having an open top including a rear edge, said mixing chamber being mounted for tilting movement on an axis, a canopy cover movably mounted and positioned above said open top, a blade carried by the rear edge of the mixing chamber and a channel member carried by the corresponding edge of the cover, said blade being adapted to be received in said channel member, said blade being disposed in a plane that when continued passes above the said axis on which the mixing chamber tilts and means for tilting said mixing chamber whereby engagement of the blade with the channel member causes upward movement on the part of the cover.

3. Mixing apparatus of the character described comprising a supporting structure, a mixing chamber tiltably mounted in said supporting structure and having an open top, said supporting structure including flanges overhanging the open top of the mixing chamber, said flanges having openings therein, and the said openings being defined by conical surfaces meeting along edges substantially in the middle of said openings, a canopy cover disposed above said open top supported in position by hangers which extend through the openings in said flanges, nuts carried by said hangers supporting said cover in position, said nuts being formed with conical surfaces substantially complemental to the conical surfaces of said openings.

4. Mixing apparatus of the character described comprising supporting structure, a mixing chamber tiltably mounted in said supporting structure and having an open top, a canopy cover hung in position over said supporting structure above said open top, said cover being movable, and a cam device including cooperating cam parts on said chamber and cover respectively, for raising the rear edge of said cover incident to tilting movement of the mixing chamber.

5. Mixing apparatus of the character described comprising supporting structure, a mixing chamber tiltably mounted in said supporting structure and having an open top, a canopy cover hung in position over said supporting structure above said open top, said cover being movable, and a cam device including cooperating cam parts on said chamber and cover respectively, for raising the rear edge of said cover incident to tilting movement of the mixing chamber, said device also constituting a means for maintaining said edge in an upraised position during tilting movement of the mixing chamber.

6. Mixing apparatus of the character described comprising supporting structure, a mixing chamber tiltably mounted in the supporting structure and having an open top, a canopy cover for the open top hung over the supporting structure, said cover being formed with projections extending beyond the ends of said mixing chamber, a bell crank pivotally mounted on said supporting structure and having one arm engaging one of said projections, and a cam member mounted coaxially with the mixing chamber and engaging the other arm of the bell crank.

7. Mixing apparatus of the character described comprising a tiltable mixing chamber having an open top and including a straight rear edge, a scraping blade detachably affixed to the straight rear edge of the mixing chamber, a canopy cover disposed above said open top, and a channel member carried by the cover along the rear edge thereof, said channel member receiving said blade, said blade having a surface engaging the channel member which is out of alignment with any radius of the pivotal mounting of the mixing chamber.

8. Mixing apparatus of the character described comprising supporting structure, a mixing chamber tiltably carried by said supporting structure and having an open top, and a canopy cover also carried by the supporting structure and positioned above said open top, said cover being movably supported by the supporting structure, and means consisting of cooperating parts carried by said chamber and cover respectively, for automatically moving said cover incident to tilting movement of the mixing chamber.

9. Mixing apparatus of the character described comprising a mixing chamber mounted for tilting movement on an axis and having an open top including front and rear edges, a canopy cover movably supported and positioned above said open top, said cover and mixing chamber being provided with interlocking structure along said front and rear edges, said interlocking structure including a member carried by the mixing chamber and having a plane surface disposed in a plane that when continued passes above said axis, and which plane surface is adapted to engage the interlocking structure on the cover to automatically break the interlock incident to tilting movement of the mixing chamber, and means for causing said tilting movement.

ROBERT M. TEMPLE.